United States Patent Office 3,434,992
Patented Mar. 25, 1969

3,434,992
BINDER COMPOSITION COMPRISING A MIX-
TURE OF A BARIUM HYDROXIDE CATA-
LYZED PHENOL-FORMALDEHYDE RESOLE
AND A MELAMINE FORMALDEHYDE
CONDENSATE
Ulrich Holtschmidt, Essen, and Alfred Michel, Schoppen-
stadt, near Braunschweig, Germany, assignor to Th.
Goldschmidt A.-G., Essen, Germany
No Drawing. Filed Aug. 23, 1965, Ser. No. 481,969
Claims priority, application Germany, Sept. 18, 1964,
G 41,545
Int. Cl. C08g 37/32, 37/18; C09j 3/16
U.S. Cl. 260—29.3                                    2 Claims

ABSTRACT OF THE DISCLOSURE

Compositions containing a mixture of resins in aqueous solution and a process of preparing such compositions is disclosed. Such compositions are obtained by mixing together the reaction products from the preparation of (i) a phenol-formaldehyde resole phenoplast prepared with barium hydroxide as catalyst, and (ii) a melamine aminoplast within certain proportions. The barium hydroxide is neutralized to an insoluble salt which is retained in the composition. The compositions are suitable as binders for wood fiber boards and adhesives for impregnation of papers, fleeces, fabrics and similar carriers, which upon impregnation and after drying are used in making laminates to improve the surface of base materials.

---

This invention generally relates to synthetic resins and is particularly directed to a process of producing aqueous synthetic resin solutions which contain a mixture of aminoplasts and phenoplasts of the resole kind.

It is a primary object of this invention to produce aqueous solutions of aminoplasts and resole phenoplasts which are suitable as binders for wood containing boards or plates, such as wood fiber boards or boards made from compressed wood flour, chips or shavings.

Another object of the invention is to provide an aqueous solution of the indicated nature which is suitable for the impregnation of papers, fleeces, fabrics and the like carriers which, upon impregnation and drying, form resin films that are used in the preparation of laminates and as coatings for improving the surface characteristics of base materials.

Another object of the invention is to provide aqueous solutions of the indicated kind which are suitable for adhesive purposes in general.

It has previously been suggested in the art to mix aminoplasts with resole resins derived from various phenolic raw materials. It has also been proposed to prepare mixed resins by the reaction of aminoplast forming agents, such as melamine, and phenols with formaldehyde, either simultaneously or successively. In these prior art methods, the condensation of the formaldehyde with the phenols and aminoplast forming agents may be carried out in alkaline or acid media in order to obtain resin mixtures which combine the beneficial characteristics both of the aminoplasts and the phenoplasts.

Such mixed resins have previously been produced in the form of aqueous solutions or in dehydrated state and are predominantly used for the production of molding masses.

German Patent No. 875,568 thus discloses a process for the production of resin-like curable condensation products in powder form, which are water soluble and which are obtained by the condensation of melamine, phenols and aldehydes. According to the teaching of this German patent, alkaline mixtures of aqueous solutions of condensation products of melamine with aldehydes and of phenols with aldehydes are dried by atomization in known manner. The melamine moiety exceeds the phenol moiety according to the teachings of this German patent.

A different process for the production of mixed condensation resins of the indicated kind is disclosed in German Auslegeschrift 1,149,902. This German Auslegeschrift suggests the production or precondensates of phenol and formaldehyde and of melamine and formaldehyde, which precondensates are subjected to a mixed condensation at a pH of 7.2.

By exactly adhering to predetermined values for viscosity, solid content and stability, aqueous solutions of such mixed resins may be used for the impregnation of carriers, for example, of paper or fabrics. Upon drying, film like materials are obtained which may be used for the production of laminates and for the surface improvement of different base materials.

Resin films manufactured from such aqueous mixed resins which have been condensed in accordance with the prior art processes exhibit, however, several disadvantages which are due to the composition of the resin mixture. It is thus known that in melamine- or urea-modified phenoplasts the properties and characteristics of the phenoplasts are dominating. This means that such resins have a dark color, have poor light fastness and lack sufficient hardness. In the reverse case, to wit, if aminoplasts are modified by phenols, a similar phenomenon can be observed as the properties and characteristics of the aminoplasts are the more dominant ones. This, of course, means that the final product is brittle and subject to the formation of cracks and fissures.

Other disadvantages of resin films made from such mixed aminoplast-phenoplast resins are presumably due to the very different and, in fact, opposing condensation and curing conditions for these two basic types of resins, to wit, aminoplasts and resole phenoplasts. The most valuable aminoplasts are the melamine resins which harden best in a slightly acidic to neutral pH range. By contrast, the resole resins do not significantly react in this pH range. Both for the formation of precondensates and also for the final curing, phenol resins of the resole type require an alkaline pH value. This, in turn, as is well known, requires substantially larger amounts of alkaline condensation agent than is necessary in the production of aminoplast precondensates.

These opposing condensation and curing conditions explain the difficulties in successfully curing mixed resins of aminoplasts and phenoplasts under the customary conditions to obtain a satisfying product, to wit, to produce film surfaces of such mixed resins which are not subject to cracks and which are resistant to boiling water, steam, solvents, diluted acids, alkali and atmospheric changes.

It has been attempted to conduct the condensation of the resole phenoplast resins in the aqueous phase to such an extent and in such a manner that the subsequent curing time is reduced. This, however, has not proved to be successful, because due to insolubility the phenol resin tends to precipitate, a phenomenon which can only be cured by increasing the alkali content or by the addition of solvents such as, for example, ethyl alcohol. Both these possibilities, however, negatively affect the final characteristics of the phenoplast, a fact which in view of the further processing and the use to which the resin is to be put ordinarily cannot be tolerated.

In any event, the content of alkaline condensation agent of the phenoplast in the mixed resin results in reduced durability and resistance of the cured resin mixture in respect to water (swelling and bubble formation) and causes a significantly increased water absorption capacity, as compared to pure aminoplasts such as melamine resins.

Prior to this invention, it was not known in the art to prepare mixtures of aminoplasts and resole phenoplast resins in such a manner that a reaction product was obtained which could successfully be used for the impregnation of carrier webs as, for example, paper webs, which upon drying formed films which could successfully be used for the surface improvements of different base materials. In particular, it was not known prior to this invention, to process such film materials under conditions as they have become known and as they are customary in the processing of melamine resins or phenol resin films. It is particularly surprising that the inventive mixed resin films may be employed in the formation of surface coatings under pressure conditions which are milder than those required for the prior art melamine or phenol resin films and that the mixed resin films of this invention, without having the disadvantages of the prior art films, combine the favorable characteristics of the aminoplasts, e.g., melamine resins, and phenoplasts. These beneficial characteristics may be summarized as follows:

(1) The resin films are extremely hard and exhibit excellent abrasion resistance.

(2) The resin films are colorless or they have only a slight self-color.

(3) They exhibit excellent fastness to light.

(4) They are very elastic and exhibit no tendency to crack or fissure formation due to overcuring or aging.

(5) They are resistant to cold and boiling water, to steam and solvents, to diluted acids and solutions of alkaline reaction.

(6) Their water absorption capacity is negligible.

(7) They are capable to withstand extreme fluctuations in atmospheric conditions.

Accordingly, it is a further object of this invention to produce mixed aminoplast and resole phenoplast condensation products which have the above enumerated characteristics.

Generally, it is an object of this invention to improve on the art of preparing mixed synthetic resins as presently practiced.

Briefly, and in accordance with this invention, aqueous solutions of mixtures of aminoplasts and resole phenoplasts, having the above-indicated beneficial characteristics are surprisingly produced in the following manner:

(a) The resole phenoplast moiety is produced by condensing a phenol with formaldehyde in the presence of barium hydroxide as catalyst. The proportions of the reactants and the barium hydroxide catalyst are critical and should be as follows: 0.35 to 0.75 mole of formaldehyde should be present for each reactive position of the nucleus of the phenolic material, while 0.01 to 0.2 mole of barium hydroxide should be present for each mole of the phenol.

(b) The aminoplast resin is separately prepared and consists either of a pure melamine resin or a melamine resin in which up to 20 mole percent of the melamine is replaced by a different aminoplast forming agent, such as, for example, thiourea. For each reactive amino group, 0.5 to 1.0 mole of formaldehyde should be employed.

(c) The precondensed individual resins of steps (a) and (b) are then homogeneously mixed with each other in such a manner that the mole ratio of phenolic material to melamine or the mixture of melamine and the other aminoplast forming compound is between 1:3 and 3:1 and (d) The barium hydroxide is transferred into a form which is insoluble in the system. This is effected by adding an acid, such as sulfuric acid, which, above a pH of 4, forms poorly soluble salts with $Ba^{++}$ ions. The addition of the acid to render the barium hydroxide insoluble may be effected either before the reaction product of step (a) has been mixed with that of step (b) or after the products of steps (a) and (b) have been mixed. The addition of the acid at the same time causes a pH adjustment to a value of about 5 to 7.

Experiments have demonstrated that the barium salts which are formed by the addition of the acid and which are insoluble or poorly soluble, do not precipitate from the resin mixture above a concentration of about 45 percent solid content. The reason for this is presumably that the resin solution acts in the manner of a protective colloid.

When the acid is added for the purpose of neutralizing the barium hydroxide, a neutral pH value is already obtained when only about 90 percent of the acid quantity which is theoretically required to neutralize the hydroxide has been added. After the entire amount of acid which theoretically is necessary to neutralize the barium hydroxide has been added, a pH value of about 6.5 is observed. This is probably due to the presence of liberated formic acid formed from barium formate which, due to Cannizzaro reaction, has been formed from the formaldehyde during the condensation of the phenol resin. It is also possible that this pH value is due to the formation of phenol formaldehyde condensates of increased acidity.

Various phenols may be used for the production of the resole phenoplasts of step (a). Particularly advantageous end products are obtained if phenol proper or phenol, m-cresol, or p-cresol are used in admixture with 4,4'-dihydroxy diphenylpropane. However, also phenolic materials as, for example, 4-tertiary butylphenol and mixtures thereof with the previously mentioned phenols yield excellent results. Generally speaking, the inventive process can be carried out with all those known phenolic materials which are known to be suitable for the production of the customary resole resins.

It has also previously been set forth that melamine is the most suitable aminoplast forming agent for the purposes of this invention. If a portion of the melamine is to be replaced by a different agent, then thiourea has proved to be particularly advantageous. However, the thiourea moiety in the aminoplast forming agent should preferably not exceed 20 mole per cent.

The inventive mixed resins are superiorly suitable for the impregnation of carrier materials such as thin sodium papers, whereby resin films or sheets are obtained which subsequently may be used for the surface improvement of various base materials, particularly wood boards such as boards of wood shavings and chips. The impregnation of carrier materials is particularly advantageously carried out if the mixed resin solution has a viscosity of 50 to 150 DIN beaker seconds. The viscosity may be adjusted by corresponding concentration and condensation. The adhesive films obtained in this manner have the advantage that they produce end products of superior quality, exhibiting excellent adhesive characteristics. The quality and adhesive characteristics are comparable, if not superior, to those of phenol resins proper which are known to be resistant to varying temperature conditions and extreme temperature fluctuations, such as repeated boiling and subsequent chilling. The mixed resin films of this invention may, however, be applied to the base material under conditions which are less stringent than those of phenol resin films, to wit, the adhesive bonding with the base material may be effected at lower temperatures and within shorter periods than that for phenoplasts. The conditions for applying the films to the base material are more comparable to those of aminoplast adhesive resins.

In aminoplast adhesive resins, the joint between the base material and the film usually assumes a dark color which, however, does not take place when the inventive resin films are applied.

Due to the superior properties and advantages of the inventive mixed resins, they are suitable not only as impregnating agents for carriers, but also directly as binders for wood containing boards and plates. High quality products are thus obtained if the inventive resin mixtures are used as binders in the production of boards made from wood shavings and wood chips. The almost neutral pH value of the resin mixture reduces corrosion of the processing plants and has a favorable effect on the wood shaving or wood chip material. The hardening or curing times which have to be employed for obtaining weather resistant boards are about the same as if aminoplasts proper are used as binders and thus are significantly shorter than the periods required for phenoplasts. As compared to phenoplasts, the inventive resin mixtures have the additional advantage that they have a lighter color. Moreover, if the inventive resin mixtures are used as binders for the indicated purpose, substantially wider moisture ranges are permissible in the production of the boards.

The invention will now be described by several examples, it being understood, however, that these examples are given by way of illustration and not by way of limitation and that many changes may be effected in process conditions without affecting in any way the scope and spirit of this invention as recited in the appended claims.

EXAMPLE 1

(a) Preparation of aminoplast moiety

The condensation of the aminoplast is effected by heating 101 parts of melamine, 15.2 parts of thiourea and 200 parts of a 30 percent formaldehyde solution at 95° C. The pH of the mixture had been adjusted to a value of 8.5 by an aqueous diluted sodium hydroxide solution. The heating of the mixture at 95° C. was continued until a sample of the solution became opaque at 20° C. when mixed with 3 times its volume of water. The mixture was then cooled.

(b) Preparation of the resole phenoplast moiety 94 parts of phenol and 130 parts of a 37 percent formaldehyde solution were reacted at 90° C. in the presence of 11.1 parts of barium hydroxide in an inert gas atmosphere. The final product had a DIN beaker vispacity of 1:2 at 20° C.

100 parts of the resole phenoplast of (b) were then mixed with 223 parts of the melamine resin of (a). The mixture was well stirred and admixed with 6.2 parts of aqueous sulfuric acid of 25 percent concentration. This resulted in a pH value of 6.7. The resin solution thus obtained is suitable for the impregnation of carriers of sodium kraft papers for the production of resin films to be used for the surface improvement of boards, such as for use in casings and form plates for concrete processing. The resin solution, if desired, may be admixed with wetting or separating agents prior to the impregnation.

EXAMPLE 2

An aminoplast precondensate was prepared from a mixture of 126 parts of melamine and 300 parts of formaldehyde solution of 30 percent concentration. The condensation was effected at a pH value of 8.8 at elevated temperature. The precondensate had a water dilution capactiy of 1:2 at 20° C.

The phenol resin was obtained by heating a mixture of 47 parts of phenol, 54 parts of cresol having an m-cresol content of 50 percent, 108 parts of a formaldehyde solution of 37 percent concentration and 15.8 parts of barium hydroxide. The heating was effected to 85° C. until a DIN beaker viscosity of 18 seconds at 20° C. was obtained.

100 parts of the phenol resin were then admixed with 172.5 parts of the melamine resin. An aqueous solution of 2.6 parts of crystalline oxalic acid were added to the mixed resin solution. The mixed resin solution thus obtained had a pH value of about 6.5 and is suitable for the impregnation of carriers for the decorative surface improvement of base materials.

EXAMPLE 3

240 parts of melamine, 7.6 parts of thiourea and 365 parts of formaldehyde solution of 37 percent concentration were condensed at 95° C. at a pH value of 8.8, until a portion of the solution exhibited slight turbidity at 20° C. with 1.5 times its volume of water. The mixture was thereafter cooled.

47 parts of phenol, 57 parts of 4,4'-dihydroxy diphenylpropane, 50 parts of a 30 percent formaldehyde solution, 30 parts of paraformaldehyde and 25.3 parts of barium hydroxide were carefully heated and agitated at 85° C. until the resin had a DIN beaker viscosity of 50 seconds at 20° C.

100 parts of the phenol resin thus obtained were mixed with 95 parts of the melamine resin, with the addition of 6 parts of ethanol. Thereafter and under effective agitation, 13.7 parts of sulfuric acid of 33 percent concentration were added, whereby a pH value of 6.5 was obtained.

This mixed resin solution is of light color and is particularly suitable for the production of overlays and light colored decorative coatings. The resin may be diluted with water or a water ethanol mixture prior to the impregnation.

EXAMPLE 4

228 parts of melamine, 15.2 parts of thiourea, 260 parts of a formaldehyde solution of 30 percent concentration and 24 parts of paraformaldehyde are condensed in a known manner at a pH value of 9 until the water dilution capacity had reached a value of 1:1.5. The solution was then cooled.

The resole phenoplast was obtained from 70 parts of phenol, 27.5 parts of cresol having an m-cresol content of about 50 percent, 70 parts of a 30 percent formaldehyde solution, 22.5 part of paraformaldehyde and 20 parts of barium hydroxide. The mixture was condensed at elevated temperature to obtain a resin of a DIN beaker viscosity of about 120 seconds at 20° C.

126 parts of the melamine resin were then mixed with 100 parts of the phenoplast. The mixture was subsequently admixed, slowly and under stirring, with 7.6 parts of sulfuric acid of 40 percent concentration. The pH value of the final product was 6.2. Thin sodium papers which were of natural color or bleached, were impregnated with the solution whereby an adhesive resin film of the described properties was obtained.

While specific embodiments of the invention have been shown and described in detail to illustrate the application of the inventive principles, it will be understood that the invention may be embodied otherwise without departing from such principles.

What is claimed is:

1. A composition containing a mixture of synthetic resins in aqueous solution which is suitable as a binder for wood fibre boards, as adhesives and for the impregnation of papers, fleeces and fabrics, which upon impregnation and after drying are used in the manufacture of laminates to improve the surface characteristics of base materials, said composition obtained by:

(A) preparing a resole phenoplast by the condensation of a phenol and formaldehyde in the presence of a barium hydroxide catalyst, in a proportion wherein about 0.35 to 0.75 mole of formaldehyde is reacted for each reactive position of the phenol nucleus and about 0.01 to 0.2 mole of the barium hydroxide is present per mole of phenol;

(B) separately preparing an aminoplast from formaldehyde and an aminoplast forming moiety containing at least 80 mole percent of melamine, in a proportion when 0.5 to 1.0 mole of formaldehyde is reacted for each reactive amino group;

(C) homogeneously mixing the reaction products formed in preparing said phenoplast and aminoplast so that the mole ratio of phenol to said aminoplast forming moiety is between 1:3 and 3:1; and (D) prior to said mixing of said reaction products or after said mixing, insolubilizing the barium catalyst by adding an acid which at a pH value above 4 forms an insoluble salt with $Ba^{++}$ ions in said composition while imparting a pH to said composition of about 5 to 7, said composition containing said insoluble salt, and wherein the concentration of solids in said composition is above 45%.

2. A composition of claim 1 wherein: the acid for converting the barium hydroxide into an insoluble salt is sulfuric acid or oxalic acid; and wherein, substantially all of the aminoplast forming moiety is melamine or at least 80% is melamine and the remainder is thiourea.

References Cited

UNITED STATES PATENTS

| | | | |
|---|---|---|---|
| 2,451,153 | 10/1948 | Charlton et al. | 260—839 |
| 2,565,538 | 8/1951 | Welch et al. | 260—839 |
| 2,834,755 | 5/1958 | Higashi et al. | 260—29.3 |
| 3,304,345 | 2/1967 | Le Blanc | 260—29.3 |

MURRAY TILLMAN, *Primary Examiner.*

JOHN C. BLEUTGE, *Assistant Examiner.*

U.S. Cl. X.R.

260—839, 840, 60; 117—155; 156—331, 335; 161—262